Patented Sept. 26, 1939

2,174,486

UNITED STATES PATENT OFFICE 2,174,486

TEXTILE PRINTING PASTES CONTAINING PENETRATING AGENTS AND PROCESSES OF PRINTING THEREWITH

Ivan F. Chambers, Wilmington, Del., and Arthur L. Fox, Woodstown, N. J., assignors to E. I. du Pont de Nemours & Company, Wilmington, Del., a corporation of Delaware No Drawing. Application March 17, 1937, Serial No. 131,451

10 Claims. (Cl. 8—70)

This invention relates to improved processes for printing textile fibers with vat dyes and to dye compositions especially adapted for such purposes. More particularly it relates to the preparation of printing compositions containing a vat dye and a material adapted to facilitate the penetration of the dye during a printing operation. Still more particularly it relates to applying to a fabric composed of natural or synthetic or mixed fibers a printing composition containing a vat dye and a penetrating agent. In a more limited sense, this invention pertains to vat dye pastes or powders containing improved penetrating agents and to fabrics dyed with the above printing compositions.

By the term "vat dye" hereinafter we refer to dyes of the anthraquinone, indigo, thioindigo and sulfur series which are capable of being reduced by the aid of alkaline hydrosulfite.

The printing of fabric with vat colors is a well known and highly developed art. It generally comprises dispersing the vat color in a thickening paste containing reducing agents, applying to the fabric by means of an engraved roller, then exposing the fabric to the action of steam, which is known as "aging", to effect reduction of the color, and finally treating with a mild oxidizing agent, and washing and soaping to remove the gum, unfixed color, etc.

Processes are also known which employ stabilized water-soluble forms of vat dyes, such as the leuco esters of vat dyes, known as "Indigosol" colors. These colors are water-soluble and require no reducing agent. Application consists in impregnating the fabric with the color and fixing the dye on the fiber by subsequent hydrolysis and oxidation.

In the processes just described and others, special assistants are generally added to the dye composition or printing paste to facilitate the dispersion of the dye, penetration, reduction, oxidation, etc. The state of perfection has not yet been attained, and the printer generally has to cope with such problems as poor penetration of the color into the fiber, low tinctorial yield, lack of brilliancy in the prints, specky or mottled prints, the latter especially on heavily delustered rayon. He is also quite restricted in the conditions of operation, and will frequently obtain inferior results if the aging time is curtailed or if the percentage of reducing agent in the printing composition is appreciably reduced. In printing with water-soluble forms of the vat dyes, the additional problem enters of obtaining deep shades. Light shades are as a rule obtained readily with leuco esters, but only a few of the latter have sufficient affinity to produce a satisfactory deep shade.

It is an object of this invention to provide a process for printing with vat dyes which is characterized by the production of uniform prints, free from speckiness, and of good penetration. It is a further object of this invention to produce novel dye compositions and/or printing pastes which are particularly adapted for the process aforementioned. It is a still further object of this invention to produce novel vat dye compositions which possess good wetting, penetrating and dispersing power, and permit of efficient utilization of the color. A still further object of this invention is to provide novel vat dye powders which are essentially non-hygroscopic and which possess good wetting, penetrating and dispersing power. A still further object is to produce prints of exceptional strength, brilliancy and penetration on natural and synthetic fibers, particularly on lustrous and delustered regenerated cellulose fibers. Another object is to produce dyeings of exceptional levelness, penetration, strength and brilliancy by the pigment-pad method or by continuous or intermittent machine method. Other and further objects of this invention will appear hereinafter.

These and other objects are accomplished by incorporating in a printing paste containing a vat dye a compound of the general formula: R–X–A wherein R may be hydrogen or a hydrocarbon radical which is joined through an acyclic carbon atom to X, X is oxygen or sulfur, and A is an acidyl radical of organic or inorganic type. When A is inorganic, R must be an aralkyl radical. The acidyl radical may contain a free acidic hydrogen atom or the latter may be neutralized by any inorganic or organic base which will form a water-soluble salt. Thus, R may be alkyl, alkenyl, aralkyl, and A may be —SO$_3$M, —PO$_3$M, BO$_3$M, R$_2$SO$_3$M, or R$_2$COOM wherein R$_2$ is alkylene or arylene and M is hydrogen or a water-soluble salt-forming group, either of organic or inorganic type. The hydrocarbon groups may be substituted with other groups such as OH, halogen, alkoxy and aliphatic acyl groups.

Typical and easily available compounds of the above general formula are benzyl glycolic acid, benzyl thioglycolic acid, trichlorobenzyl thioglycolic acid, alpha:alpha-dimethylbenzyl thioglycolic acid, S-benzyl thiosalicylic acid, orthohydroxymethylbenzoic acid sodium salt, benzothiazole thioglycolic acid, benzyl sulfate, benzyl thiosulfate, allyl thioglycolic acid, S-(2:3-dihydroxy-1-propyl)-thioglycolic acid, keto-butyl-thioglycolic acid (CH₃COCH₂CH₂SCH₂COOH), sodium hexalin glycolate, and sodium terpineol glycolate. Other compounds similar to the specific ones given will be readily apparent to those skilled in the art after a study of this specification. Mixtures of the above-listed types of compounds may also be used. It will be noted that certain of the above compounds are water-soluble while others are only water-soluble if present in the form of their salts. Those compounds containing solubilized groups may be neutralized by a cation which does not impair the water-solubilizing tendencies of the solubilized group. Such cations are the alkali metals of sodium and potassium, ammonium, and water-soluble organic bases and especially those which contian free OH groups or other groups conferring water-solubility. Examples of such organic bases are the mono-, di- or trialkylamines, mono-, di- or triethanolamines, the corresponding propanolamines, the butylamines, cyclohexylamine, cyclohexyl cyclohexyl mono- or diethanolamine, dimenthyethanolamine, N-butylamine, guanidine, tetraethylammonium hydroxide, glucamine, N-methyl glucamine, diglycerylyamine, 1:3-diamino-2-propanol, 1-aminopropyl-diol.

While we have found that there is some equivalency of function between all of the compounds and structural similarities, we have discovered that there are certain classes of compounds which have distinct properties and are superior in certain instances to other compounds falling under the general formula. Thus, one preferred embodiment of our invention relates to vat dye compositions containing compounds of the general formula: R—X—R₂COOM wherein R is hydrogen, alkyl, alkenyl, aralkyl or a heterocyclic compound containing a benzene ring, X is —O— or —S—, and R₂ is alkylene, aralkylene or arylene, and M is a water-soluble salt-forming group either of organic or inorganic type. The hydrocarbon radicals may be further substituted by hydrocarbon radical, halogen, hydroxyl, alkoxy or acyl groups which have less than five carbon atoms. When the radical R contains a double bond radical in an open or closed carbon chain which is attached to an acyclic carbon atom, viz.,

the products possess exceptional properties as penetrating agents. As examples of such compounds mention is made of benzyl glycolic, benzyl thioglycolic, 1-benzothiazole glycolic, alpha-alpha-dimethyl-benzyl thioglycolic, allyl thioglycolic, hydroxymethyl-benzoic and alpha-methoxy-ortho-toluic acids, and their water-soluble salts, and compounds of the formula:

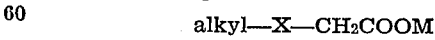

wherein alkyl is a mixture of at least five carbon atom straight and branched chain alkyl radicals such as those which correspond to the higher alcohols obtained in the methanol synthesis, and X and M have the foregoing significance.

The latter types of compounds may be prepared as follows: A mixture of the higher alcohols referred to are mixed with an alkali metal, for example sodium, and heated to 120° C. with agitation until the sodium was dissolved, and then cooled. The alcoholates are then reacted at a temperature of about 49° C. with a halogenoacetic acid dissolved in a mixture of the above alcohols to give the corresponding glycolic acid derivatives. The condensation of the sodium alcoholate and monochloracetic acid may be carried out in the presence of an anhydrous diluent such as naphtha, gasoline, toluene, or xylene. Various soluble salts may be prepared in the usual manner. The alcohol mixtures may vary widely. Fractions having the following characteristics have special utility.

(a) A mixture of six carbon atom primary and seven carbon atom secondary monohydric alcohols (B. P. 135°–150° C.).

(b) A mixture of seven carbon atom primary and eight carbon atom secondary alcohols (B. P. 150°–160° C.).

(c) A mixture of eight carbon atom to ten carbon atom primary and secondary alcohols (B. P. 160°–200° C.).

(d) A mixture of primary and secondary alcohols having ten and more carbon atoms (B. P. 200°–260° C.).

These alcohol mixtures are more fully described in Ivan F. Chambers application Serial No. 35,667 filed August 10, 1935.

Good results are obtained when a primary or secondary alcohol having from four to twelve carbon atoms is used as a source of the alkyl radical of the above formula. Execellent results have been obtained with the following alcohols:

Butyl alcohol
Amyl alcohol
Hexyl alcohol
Heptyl alcohol
Octyl alcohol
Decyl alcohol
2-methyl-1-pentanol
4-methyl-1-pentanol
2,4-dimethyl-1-pentanol
3-methyl-2-pentanol
2,4-dimethyl-3-pentanol
2-methyl-3-pentanol
4-methyl-1-hexanol
2,4-dimethyl-1-hexanol
2,5-dimethyl-3-hexanol Higher primary and secondary alcohols below $C_{12}$ In another important form of the invention, compounds of the general formula: R—X—SO₃M wherein R is an arakyl radical which may be further substituted by hydroxyl, halogen or lower alkoxy, X is —O— or —S—, and M is hydrogen or a water-soluble salt-forming group of organic or inorganic type, are incorporated in a vat dye printing paste. The following compounds are illustrative of those falling under this formula: Benzyl sulfate, benzyl thiosulfate, alpha-naphthylmethyl sulfate, alpha-naphthylmethyl thiosulfate, and their alkali metal, alkaline earth metal, ammonium and amine salts.

This invention does not require the use of the above novel assistants exclusively but, on the contrary, other assistants of the customary and well known types may be added and indeed are often very desirable. These subsidiary assistants may be incorporated into the eventual printing paste in any desirable manner. For instance, they may be mixed with the penetrating agents of this invention to produce an assistant preparation for the convenient use of the printer, or they may be incorporated by the dye manufacturer directly in the dye preparation, paste or powder to be marketed thus as a color preparation especially suited for printing. Or one of the assistants may be incorporated into the thickening paste or reducing preparation eventually mixed with the dye.

Among these additional or subsidiary assistants may be mentioned wetting and dispersing agents, reducing agents, reducing catalysts, emulsifying agents, lubricants, inert solid or liquid diluents, etc. The individual representatives of these various classes are well known in the art of printing, and it will be sufficient for the purpose of illustration to name here but a few typical members, for instance, isopropyl naphthalene sodium sulfonate, diethylene glycol, sodium oleate, pine oil, glucose, sucrose, dextrine, sodium carbonate, sodium hydrosulfite, formopon, rongalite, hydroxyalkylamines, tetralin sodium sulfonate, tetralin, hexalin, glycerin, glycol bori borate, etc.

The concentration of these new assistants and their method of application may vary within wide limits, depending on the desired results or convenience. The following general procedure may be used:

(a) Addition of an aqueous solution of the solubilized assistant to the printing composition.

(b) Addition of dry salts of these assistants to the printing composition.

(c) Addition to the printing composition of the dry salts in powder or flake form mixed with sugar, starch or British gum.

(d) Preparation of an assistant color paste whereby the vat color pigment or leuco sulfuric ester derivative is intimately mixed with an aqeuous solution of the salts of these assistants.

(e) Preparation of an assistant color powder whereby the vat color pigment is intimately mixed with a dry salt of any of the above assistants and/or an inert diluent such as sugar, glucose, dextrine, etc.

The proportion of assistant with respect to the weight of the printing paste may likewise vary within wide limits, good results being obtained with proportions from about 0.5 to about 20.0%, depending on the individual assistant used. As a general rule, when amounts falling within the range given, for example from 0.5% to about 5.0% are used, the prints are free from speckiness and are characterized by good and in some cases even excellent penetration. When amounts of about 5% to about 20% are used, the prints are not only uniform, free from speckiness and of exceptional strength and brilliance, but have excellent penetration.

Where these assistants are incorporated into the marketable dye composition, the latter may be prepared in paste form or dry, for instance, powder, grains or flakes, with suitable diluents such as glucose, sucrose, dextrine, etc., as most convenient.

This invention will be further illustrated but is not limited by the following examples in which the parts are by weight.

In these examples, for the purpose of comparison three types of thickening pastes are used and they shall be referred to, respectively, as "Thickener A, B and C", each containing as a common basic ingredient a starch-British-gum paste hereinafter designated as "Thickening SBG".

*Example I*

This example illustrates the preparation of various thickening pastes.

*Thickening SBG:*
  100 parts of wheat starch and
  300 parts of British gum were pasted with
  600 parts of water
  ———
  1000 parts.

This mixture was heated to the boil for ten minutes and cooled to room temperature. A smooth paste was obtained.

*Thickener A:*
  560 parts of Thickening SBG were heated to 170° F. There were then added
  170 parts of potassium carbonate. After the potassium carbonate had dissolved, the paste was cooled to 140° F., and the following ingredients were added
  120 parts of sodium formaldehyde sulfoxylate
  50 parts of glycerin
  100 parts of water
  ———
  1000 parts.

The whole was then stirred to form a smooth paste.

*Thickener B:*
  550 parts of Thickening SBG
  50 parts of potassium carbonate
  250 parts of caustic soda (35% solution)
  150 parts of glucose
  ———
  1000 parts.

*Thickener C:*
  520 parts of Thickening SBG were heated to 170° F. There were then added
  200 parts of potassium carbonate. The paste was cooled to 140° F., and the following ingredients were added
  180 parts of sodium formaldehyde sulfoxylate
  50 parts of glycerin
  50 parts of water
  ———
  1000 parts.

The whole was agitated to form a smooth paste.

*Example II*

20 parts of Sulfanthrene Blue 2BD Double Paste (Color Index #1184) were mixed with
  70 parts of Thickener A. To this were added
  10 parts of sodium benzyl thioglycolate
  ———
  100 parts.

Lustrous and titanium dioxide delustered rayon piece goods were printed with the printing composition prepared as described above, dried and aged for five minutes at 214° F. in a Rapid ager of the Mather Platt type. The printed material was then treated for one minute in an oxidizing bath at 140° F. containing 0.5% of sodium bichromate and 0.5% of acetic acid, rinsed in cold water, soaped for five minutes in a soap bath at 160° F. containing 0.5% of soap, rinsed and dried. A brilliant level print was obtained on both types of fabric according to the pattern of the printing roll. The print was very sharp in outline and showed exceptionally good penetration to the reverse side of the fabric.

In the above example, the dye may be replaced by any other vat dye of the thioindigo or anthraquinone series, for instance "Ponsol" Dark Blue BR Paste (Color Index #1099), "Ponsol" Jade Green Paste (Color Index #1101), "Sulfanthrene" Yellow R Paste (Color Index #1170), "Sulfanthrene" Orange R Paste (Color Index #1217), "Sulfanthrene" Violet B Double Paste (Color Index #1222), "Ponsol" Yellow G Double Paste (Color Index #1118), "Ponsol" Golden Orange Double Paste (Color Index #1113), Du Pont Vat Yellow 8G Double Paste, "Ponsol" Brown AR Double Paste (Color Index #1151), and numerous others. The sodium benzyl thioglycolate in the above preparation was prepared as follows:

372 grams of benzyl mercaptan
700 cc. of alcohol
300 cc. of 10 N-sodium hydroxide and
200 grams of ice were all mixed with stirring. To this was added through a dropping funnel a solution of
300 grams of chloracetic acid in
400 cc. of alcohol
200 grams of ice and
300 cc. 10 N-sodium hydroxide.

After the reaction was complete, the alcohol was distilled off and the residual aqueous solution boiled with bone black, filtered and acidified hot. The oily benzyl thioglycolic acid was separated and treated with 10 N-sodium hydroxide and oven-dried.

The sodium salts of the mixed alkyl glycolic and thioglycolic acids in which the alkyl radicals correspond to the higher alcohols obtainable by the methanol synthesis may be substituted with equally good results for the benzyl thioglycolate of this example. Suitable alkyl mixtures are described upon page 2 of this specification.

Example III 15 parts of "Sulfanthrene" Orange R Paste (Color Index #1217)
70 parts of Thickener A as prepared in Example I
12 parts of alpha:alpha-dimethyl benzyl thioglycolic acid sodium salt
3 parts of sodium hydrosulfite 100 parts.

The whole was stirred to form a smooth paste and piece goods of lustrous and titanium dioxide rayon were printed, aged and developed as in Example II. Especially bright prints of excellent penetration were obtained.

The alpha:alpha-dimethyl benzyl thioglycolic acid sodium salt was prepared as follows:

12.4 grams of benzyl mercaptan
10.0 cc. of 10 N-sodium hydroxide and
25.0 cc. of alcohol were mixed and to them was added a solution of 13.6 grams of methyl-alpha-chloro-isobutyrate in 25 cc. of alcohol. These were warmed on a steam bath and sodium chloride separated. It was refluxed with stirring one hour and then filtered from sodium chloride. The filtrate was refluxed with 25 cc. of 10 N-sodium hydroxide for two hours and then acidified, and the oil separated and made alkaline with sodium hydroxide. Then it was oven-dried and the crude material so obtained used as a printing assistant.

Example IV 10 parts of "Sulfanthrene" Brown G Paste (Truttwin #200) were mixed with
42 parts of Thickening SBG. To this were added
5 parts of glycerin
8 parts of caustic soda (35%)
10 parts of potash
10 parts of glucose and
15 parts of ortho-hydroxymethyl-benzoic acid sodium salt.

100 parts.

Cotton and rayon piece goods were printed with the above printing composition, dried, aged, oxidized, soaped and finished according to the procedure described in Example II. Excellent prints were obtained showing superior penetration.

Example V

The procedure was the same as that of Example IV, except that alpha-methoxy-ortho-toluic acid sodium salt replaced the ortho-hydroxymethyl-benzoic acid sodium salt. Prints of greatly superior penetration and brightness were obtained. In place of the alpha-methoxy-ortho-toluic acid sodium salt, one may use with equal success alpha-ethoxy-ortho-toluic acid sodium salt.

Example VI

The procedure was the same as that of Example IV, except that beta-benzyl thio-ethane-alpha-sulfonic acid was used to replace the ortho-hydroxymethyl-benzoic acid sodium salt. The penetration and brightness obtained are exceptionally good.

Example VII

A printing composition was prepared as follows:

15 parts of "Sulfanthrene" Pink FF Paste (Color Index #1211) were mixed with
47 parts of Thickening SBG
7 parts of potash
5 parts of caustic soda (35%)
5 parts of glycerin
4 parts of sodium hydrosulfite
7 parts of sodium formaldehyde sulfoxylate and
10 parts of benzyl thioglycolic acid sodium salt 100 parts.

The whole was then stirred until a smooth paste was obtained and allowed to cool to room temperature. The piece goods containing cotton, cuprammonium rayon and cellulose acetate fibers were printed with the above printing composition, dried, aged, oxidized, soaped, and finished according to the procedure described in Example II. A brilliant red print was obtained which was very sharp in outline and which showed exceptional penetration to the reverse side of the fabric.

The Pink FF Paste may be substituted by "Ponsol" Jade Green (Color Index #1101), "Ponsol" Flavone GC (Color Index #1095), "Sulfanthrene" Blue 2BD Double Paste (Color Index #1184), or "Sulfanthrene" Orange R (Color Index #1217), with equally good results.

Example VIII

The procedure was the same as that of Example IV except that benzyl sodium sulfate replaced the ortho-hydroxy-methyl-benzoic acid sodium salt. Prints of good penetration are obtained. In place of the benzyl sodium sulfate, one may use with equally good results benzyl sodium thiosulfate.

Example IX

The procedure was the same as that of Example IV except that the ortho-hydroxymethyl-benzoic acid sodium salt was replaced by the sodium salt of 2-benzothiazole thioglycolic acid. Prints with still better penetration are obtained if one uses the triethanolamine salt of benzothiazole thioglycolic acid. This appears to be caused by the greater solubility of the triethanolamine salt.

*Example X*

The procedure was the same as that of Example IV except that the ortho-hydroxymethyl-benzoic acid sodium salt was replaced by the sodium salt of allyl thioglycolic acid. Prints of exceptionally good brightness and penetration were obtained.

*Example XI*

The procedure was the same as that of Example IV except that 2,3-dihydroxypropyl thioglycolic acid sodium salt was used in place of the ortho-hydroxymethyl-benzoic acid sodium salt. Good penetration was obtained.

*Example XII*

The procedure was the same as that of Example IV except that the sodium salt of (alpha-naphthylmethyl)-thioglycolic acid was used in place of ortho-hydroxymethyl-benzoic acid sodium salt. Prints showing fair penetration were obtained. In place of the sodium salt, one may use the triethanolamine salt and obtain better penetration than is given by the sodium salt.

*Example XIII*

The procedure was the same as that of Example IV except that S-benzyl thiosalicylic acid sodium salt was used in place of the ortho-hydroxymethyl-benzoic acid sodium salt. Good penetration and brightness were obtained.

*Example XIV*

The procedure was the same as that of Example IV except that 2,4,6-trichlorobenzyl thioglycolic acid sodium salt was used in place of the ortho-hydroxymethyl-benzoic acid sodium salt. Prints showing some improvement in penetration were obtained, but because of the fact that this sodium salt is decidedly more insoluble than sodium benzyl thioglycolic acid the improvement is much less.

The invention has the advantage that vat dye printing compositions may be easily and economically prepared. A further advantage resides in the feature that prints characterized by unusual penetration to the reverse side of the fabric may be easily obtained. A still further advantage resides in the fact that prints which are free from specks, mealy or mottled effects may be obtained on a commercial scale with facility. The advantages gained are more noticeably apparent in heavy shades than in light shades. This invention has the still further advantage that unusual penetration of the dye is obtained in printing both lustrous and delustered rayon fabrics, and cellulose acetate and cotton fabrics.

As many apparently widely different embodiments of this invention may be made without departing from the spirit and scope thereof, it will be understood that we do not limit ourselves to the specific embodiments thereof except as defined in the appended claims.

We claim:

1. A printing composition containing a penetrating agent of the general formula R—X—A wherein R is a member of the group consisting of hydrocarbon and benzothiazole radicals which are joined to X through an acyclic carbon atom, X is an atom selected from the group consisting of —O— and —S—, and A is an acidyl radical taken from the group consisting of organic and inorganic acidyl radicals, when A is inorganic R must be aralkyl, and further characterized in that R or A may contain a substituent taken from the class consisting of halogen, hydroxyl, alkoxy, aliphatic acyl and hydrocarbon.

2. A printing composition comprising a vat dye and a penetrating agent of the general formula R—X—R₂COOM wherein R is a member taken from the group consisting of hydrocarbon and benzothiazole radicals which is joined to X through an acyclic carbon atom, X is an atom selected from the group consisting of —O— and —S—, $R_2$ is a hydrocarbon radical, and M is a member of the group consisting of hydrogen and water-soluble salt-forming groups.

3. A printing composition comprising a vat dye and a penetrating agent of the general formula R—X—R₂COOM wherein R is a hydrocarbon radical containing a double bond between two carbon atoms, one of which is attached to X through an acyclic carbon atom, X is an atom selected from the group consisting of —O— and —S—, $R_2$ is a methylene radical, and M is a member of the group consisting of hydrogen and water-soluble salt-forming groups.

4. A printing composition comprising a vat dye and a penetrating agent of the general formula

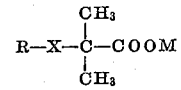

wherein R is a hydrocarbon radical having at least six carbon atoms which is attached to X through an acyclic carbon atom, X is an atom selected from the group consisting of —O— and —S— and M is a member of the group consisting of hydrogen and water-soluble salt-forming groups.

5. A vat dye printing composition containing as a penetrating agent a water-soluble salt of allyl-thioglycolic acid.

6. A vat dye printing composition containing as a penetrating agent an alkali metal salt of an alkyl-thioglycolic acid.

7. A printing composition containing a vat dye and a penetrating agent of the general formula: R—X—SO₃M wherein R is an aralkyl radical, X is an atom taken from the group consisting of —O— or —S—, and M is a member of the group consisting of hydrogen and water-soluble salt-forming groups.

8. A printing composition comprising a vat dye and an alkali metal benzylsulfate.

9. A printing composition comprising a vat dye and as a penetrating agent the sodium salt of an α,α-dimethyl-benzyl-thioglycolic acid.

10. In a process of coloring fabrics, the step which comprises printing a fabric with a printing paste containing a penetrating agent of the general formula: R—X—A wherein R is a member of the group consisting of hydrocarbon and benzothiazole radicals which are joined to X through an acyclic carbon atom, X is an atom selected from the group consisting of —O— and —S—, and A is an acidyl radical taken from the group consisting of organic and inorganic acidyl radicals when A is inorganic, R must be aralkyl, and further characterized in that R or A may contain a substituent taken from the class consisting of halogen, hydroxyl, alkoxy, aliphatic acyl and hydrocarbon.

IVAN F. CHAMBERS.
ARTHUR L. FOX.

CERTIFICATE OF CORRECTION.

Patent No. 2,174,486. September 26, 1939.

IVAN F. CHAMBERS, ET AL.

It is hereby certified that error appears in the printed specification of the above numbered patent requiring correction as follows: Page 2, first column, line 22, strike out "cyclohexyl"; line 23, for "dimenthye" read dimethyle; line 26, for "diglycerylyamine" read diglycerylamine; same page, second column, line 27, for "Execellent" read Excellent; and that the said Letters Patent should be read with this correction therein that the same may conform to the record of the case in the Patent Office.

Signed and sealed this 7th day of November, A. D. 1939.

(Seal) Henry Van Arsdale,
Acting Commissioner of Patents.